United States Patent [19]

Hsieh et al.

[11] Patent Number: 5,679,073
[45] Date of Patent: Oct. 21, 1997

[54] DOOR ASSEMBLY FOR A MOTOR VEHICLE CLIMATE CONTROL SYSTEM

[75] Inventors: Hsiao-an Hsieh, Troy; Prakash T. Thawani, Farmington Hills; Nicos T. Agathocleous, Canton; Manfred Koberstein, Troy; Scott E. Jones, Whitmore Lake, all of Mich.

[73] Assignee: Ford Motor Company, Dearborn, Mich.

[21] Appl. No.: 586,450

[22] Filed: Jan. 16, 1996

[51] Int. Cl.⁶ ..................................... B60H 1/00
[52] U.S. Cl. .................. 454/69; 137/625.31; 251/118; 251/298
[58] Field of Search ............... 454/69, 156, 160; 251/248, 118, 120, 305; 137/625.31

[56] References Cited

U.S. PATENT DOCUMENTS

| | | |
|---|---|---|
| 3,298,677 | 1/1967 | Anderson ..................... 251/305 X |
| 3,857,542 | 12/1974 | Heymann . |
| 3,960,177 | 6/1976 | Baumann . |
| 4,498,528 | 2/1985 | Jacquet . |
| 4,815,362 | 3/1989 | Ishizuka et al. . |
| 4,878,420 | 11/1989 | Rubig et al. . |
| 5,101,883 | 4/1992 | Kinmartin et al. . |
| 5,220,944 | 6/1993 | Burnett et al. . |

FOREIGN PATENT DOCUMENTS

| | | | |
|---|---|---|---|
| 62-151673 | 7/1987 | Japan | ............... 251/305 |
| 1-311911 | 12/1989 | Japan | ................. 454/69 |
| 544817 | 3/1977 | U.S.S.R. | ............... 251/305 |

*Primary Examiner*—Harold Joyce
*Attorney, Agent, or Firm*—Raymond L. Coppiellie

[57] ABSTRACT

A door assembly for controlling air flow through a motor vehicle climate control system includes a door panel having a pair of opposed faces and a terminal edge. A seal member is attached to at least one of the pair of opposed faces and has a terminal edge generally disposed along the terminal edge of the panel. A film member overlies the seal member and also has a terminal edge generally disposed along the terminal edge of the panel. The terminal edge of the film member is substantially non-linear such that noise produced by air flow passing around the terminal edge of the panel is minimized.

17 Claims, 2 Drawing Sheets

DOOR ASSEMBLY FOR A MOTOR VEHICLE CLIMATE CONTROL SYSTEM

BACKGROUND OF THE INVENTION

1. Field of the Invention

The present invention relates to a door assembly for controlling air flow through a motor vehicle climate control system. More particularly, the present invention relates to a door assembly which is configured such that noise generated in response to air flow through the system is minimized.

2. Description of Related Art

Motor vehicle climate control systems typically have at least one door assembly for controlling the flow of air therethrough. Often, the door assembly comprises a door panel with a compressible seal member attached thereto. The compressible seal member is positioned so as to seal against one or more seats provided on the interior walls of the climate control system when the door assembly is in a closed position.

A problem associated with conventional seal members is that they are made of materials such as foams that tend to collect moisture, thereby providing an environment in which odor-producing organisms can grow. One known solution to this problem is to provide a plastic film member overtop the seal member. The film member has been found to be effective in preventing moisture from penetrating into the seal member. One drawback of this solution, however, is that the film member tends to vibrate in response to air flow around the door assembly when the door assembly is in an open position. In prior art door assemblies, this vibration creates a whistling noise that is audible to the occupants of the motor vehicle. While others have suggested ways to prevent the generation of flow or wind noise around door assemblies in climate control systems (see, for example, U.S. Pat. Nos. 4,815,362 and 4,878,420), these approaches do not address the above-described whistling problem. It would therefore be desirable to provide a door assembly for a climate control system which has a plastic film member yet does not generate an objectionable whistling noise in response to air flow through the system.

SUMMARY OF THE INVENTION

The present invention provides a door assembly for controlling air flow through a motor vehicle climate control system which overcomes the disadvantages of the prior art. The door assembly includes a door panel having a pair of opposed faces and at least one terminal edge. A seal member is attached to at least one of the pair of opposed faces and has a terminal edge generally disposed along the at least one terminal edge of the panel. A film member overlies the seal member and also has a terminal edge generally disposed along the at least one terminal edge of the panel. The terminal edge of the film member is substantially non-linear such that noise produced by air flow passing around the at least one terminal edge of the panel is minimized.

According to one aspect of the present invention, the seal member terminal edge is congruently disposed with the film member terminal edge along the at least one terminal edge of the panel.

It is an advantage of the present invention to provide a door assembly having a protective film member that does not produce an objectionable whistling noise during operation.

These and other features and advantages of the present invention will be more fully described below with reference to the following detailed description and drawings.

DETAILED DESCRIPTION OF PREFERRED EMBODIMENTS

Figure 1:
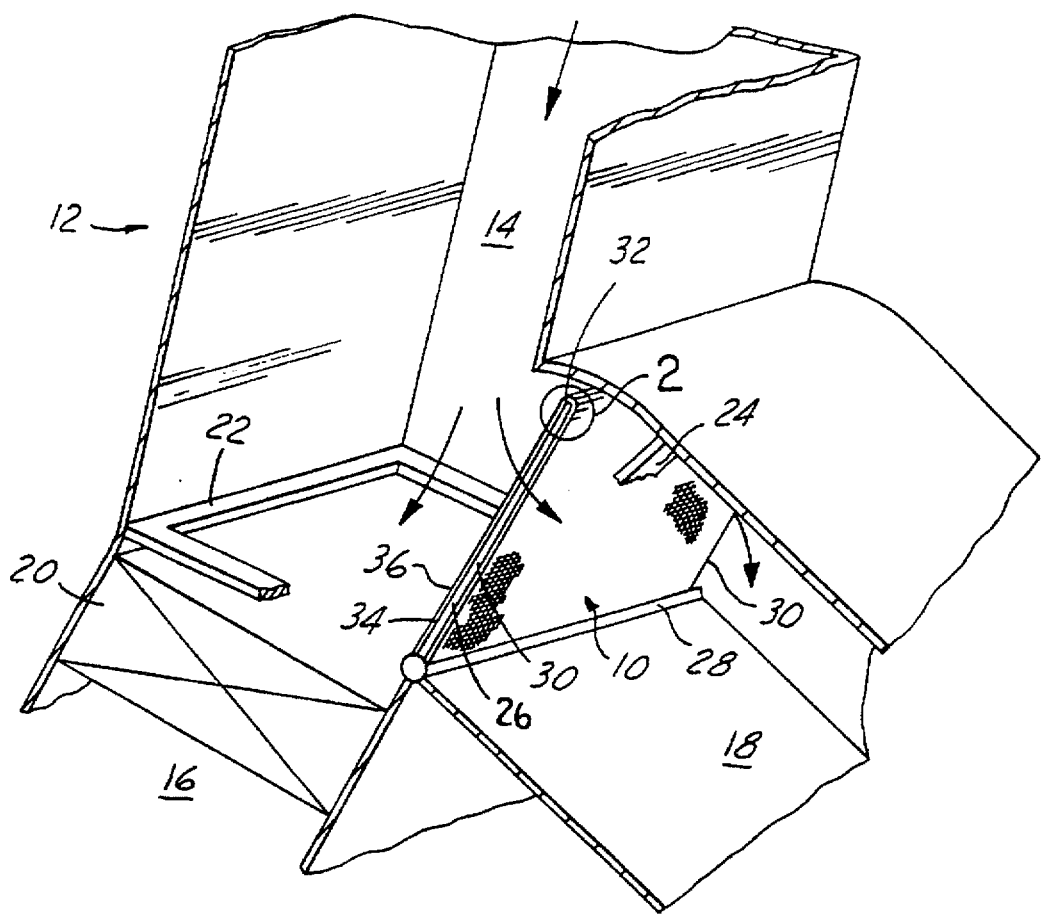
FIG. 1 is a perspective view, partially cutaway, of a motor vehicle climate control system having a door assembly positioned therein.

Referring now to the drawings, and in particular to FIG. 1 thereof, a door assembly 10 for controlling air flow through a motor vehicle climate control system 12 is shown. Door assembly 10 is pivotally mounted about a transverse axis within climate control system 12 at a location where a single air flow passage 14 branches into two air flow passages 16, 18. As illustrated in FIG. 1, air flow passage 16 is provided with a heat exchanger core, such as heater core 20. Air flowing through passage 16 passes through and is heated by heater core 20.

Using a conventional actuator (not shown), door assembly 10 is pivotally operable between first and second limit positions determined by a first stop member 22 adjacent the upstream end of passage 16, and a second stop member 24 adjacent the upstream end of passage 18. When seated against stop member 22, door assembly 10 blocks passage 16 and the air flow from passage 14 is directed into passage 18. Conversely, when door assembly 10 is seated against stop member 24, passage 18 is blocked and the air flow from passage 14 is directed into passage 16. When door assembly 10 is in an intermediate position between the two limit positions, a portion of the air flow from passage 14 is directed into passage 16 while the remainder is directed into passage 18. Thus, the position of door assembly 10 determines the relative amount of air that flows through passages 16, 18. Since the air flowing through passages 16, 18 is generally allowed to mix at a location downstream from the illustrated branching point, the position of door assembly 10 also determines the temperature of the air which ultimately passes into the passenger compartment of the vehicle. For this reason, door assembly 10 is often referred to as a temperature control or a temperature blend door.

Turning now to the construction of door assembly 10, a door panel 26 is provided for imparting structural rigidity to the assembly. Suitable materials for panel 26 are well-known in the art and include plastic and metal substrates, such as polystyrene and steel. In the illustrated embodiment, door panel 26 is a generally planar, generally rectangular web having a pivot edge 28 and three free terminal edges. The three free terminal edges include two terminal side edges 30, and a terminal distal edge 32. As illustrated, side edges 30 are generally orthogonal to pivot edge 28, while distal edge 32 is generally parallel to and spaced apart from pivot edge 28.

Door assembly 10 further comprises a seal member 34 which, in the illustrated embodiment, is attached to both faces of panel 26. Seal member 34 is generally made of a compressible material, such as a foam. Suitable foams for use with temperature blend doors are well-known to those skilled in the art and include, for example, polyester and polyurethane foams commercially available from Recticel of Trilport, France. While seal member 34 is depicted as a one-piece body folded over distal edge 32 of panel 26, seal member 32 may also comprise multiple pieces of compressible material separately attached to panel 26. Furthermore, seal member 32 need not extend over the central face portions of panel 26 in the manner shown. For sealing purposes, seal member 32 need only be provided adjacent the peripheral or terminal edges 30, 32 of panel 26, since the sealing contact between door assembly 10 and the generally U-shaped stop members 22, 24 occurs adjacent these edges.

Door assembly 10 further comprises a protective, thin film member 36, which is provided in overlying relationship with seal member 34 to prevent moisture from collecting within the seal member. Various conventional barrier materials may be used for film member 36. Plastics, such as polyesterurethane and polyvinylchloride, for example, are suitable moisture barriers. A preferred polyesterurethane film is commercially available from Recticel of Trilport, France under the product designation U-04-S. The thickness of thin film member 36 is preferably less than about 1.0 mm, more preferably less than about 0.5 mm, and most preferably less than about 0.1 mm. Film member 36 may be joined to seal member 34 using a conventional adhesive. Alternatively, seal member 34 and film member 36 may be joined by directly foaming seal member 34 onto film member 36.

Figure 2:
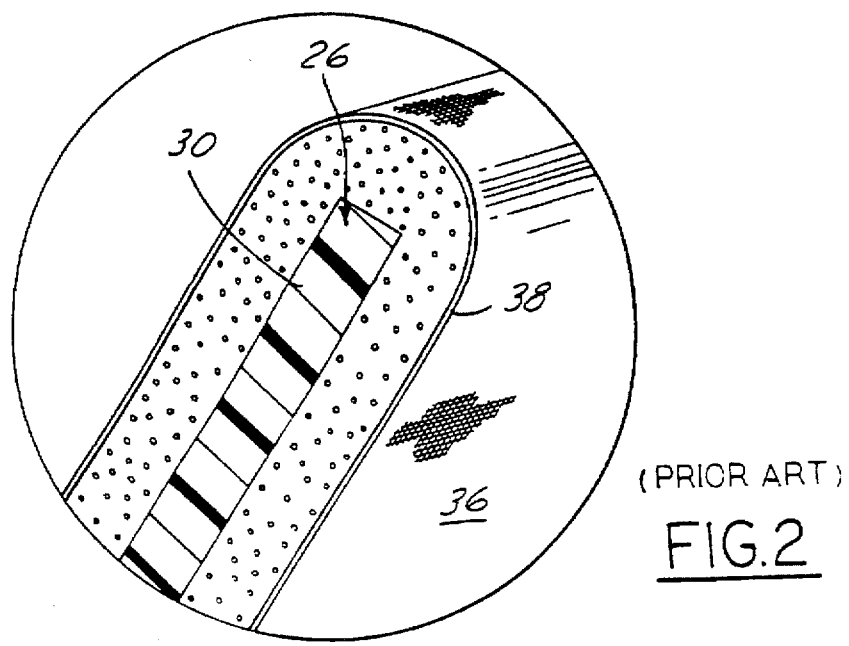
FIG. 2 is an enlarged view of the area labeled 2 in FIG. 1, showing a door assembly according to the prior art.

FIGS. 2-5 show enlarged views of various door assemblies 10. For ease of description and understanding, like reference numerals are used in each figure to refer to like components. In FIG. 2, a perspective view of a portion of prior art door assembly 10 is shown. As illustrated, film member 36 has a terminal edge 38 disposed generally linearly along the substantially linear terminal edge 30 of door panel 26. Stated in another way, terminal edge 38 of film member 36 lies in substantially the same plane as terminal edge 30 of door panel 26. When door assembly 10 is in an intermediate position, such as that shown in FIG. 1, air flow passes around film edge 38, causing it to vibrate. Under sufficient vibrational excitation, the relatively long, linear edge 38 of film member 36 behaves as an acoustical "line source", producing a distinct, audible tone or whistle. This noise generating mechanism is substantially similar to the manner in which a free reed in a musical instrument such as a harmonica produces sound through vibration. Vibrating film member 36 may also produce a whistling noise through a mechanism substantially similar to the mechanism by which a strike reed in a musical instrument such as a clarinet produces sound. That is, when door assembly 10 is in an intermediate position adjacent one of the stop members, e.g., stop member 24, the terminal edge of film member 36 may contact and release the stop member in rapid, repetitive succession, creating a series of pressure pulses through air passage 18. These pressure pulses are perceived by the occupants of the vehicle as whistles or tones.

In contrast to the prior art door assembly 10 illustrated in FIG. 2, FIGS. 3-5 show embodiments of door assembly 10 according to the present invention in which noise generated by the vibration of film member 36 in response to air flow is minimized. In each of these embodiments, film member 36 has a substantially non-linear terminal edge that is generally disposed along terminal edge 30 of door panel 26. Each of these non-linear terminal film edges comprises a pattern or series of indentations. The indentations effectively break up the terminal film edge into a number of short segments which are relatively inefficient radiators of sound. Thus, even though the short segments may vibrate on exposure to an airstream, the sound generated thereby will generally have insufficient amplitude to be heard by occupants of the vehicle. Moreover, depending on the effective length of the segments, the frequency of the sound generated thereby may be so high as to be outside of the audible range (e.g., greater than about 20 KHz). This is because short acoustical line sources and acoustical point sources radiate sound at higher frequencies than longer acoustical line sources. Pressure pulses produced by the action of the non-linear terminal film edge against stop members 22, 24 are also substantially reduced as compared to those produced by prior art linear film edge 38.

Figure 3:
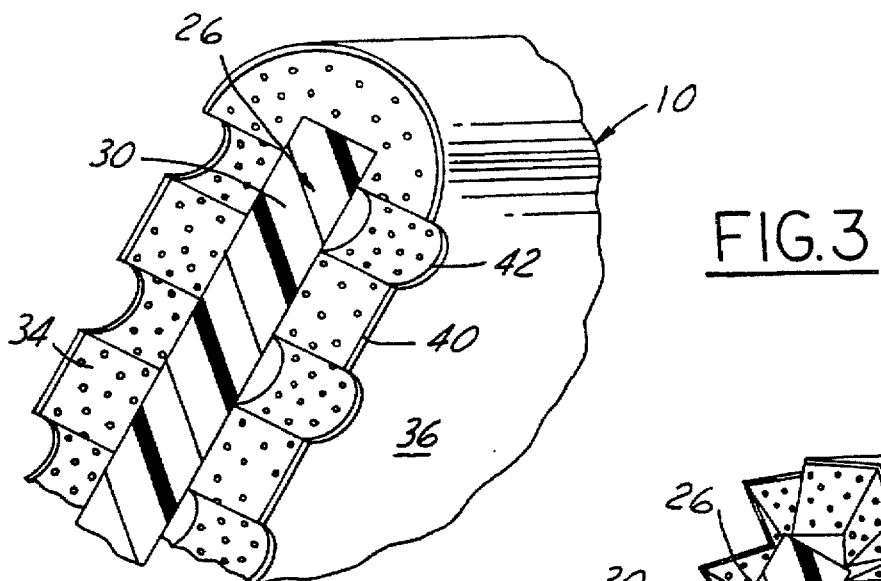
FIG. 3 is an enlarged view of the area labeled 2 in FIG. 1, showing a door assembly according to the present invention.
Figure 4:
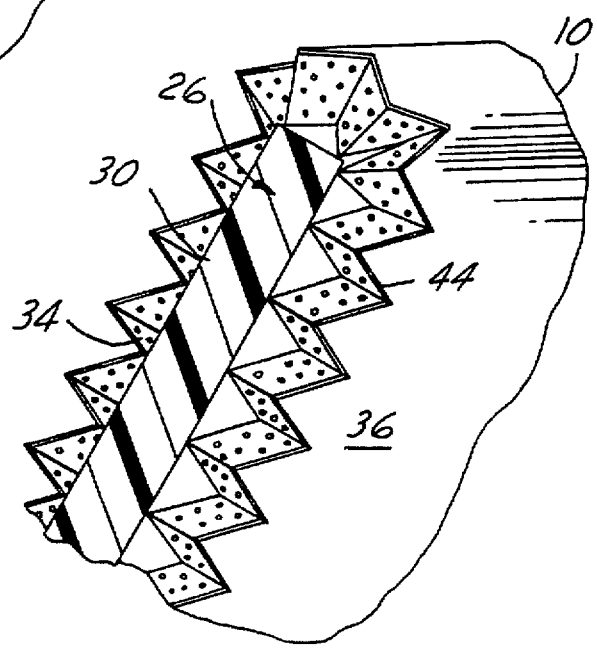
FIG. 4 is an enlarged view of the area labeled 2 in FIG. 1, showing an alternative embodiment of a door assembly according to the present invention.
Figure 5:
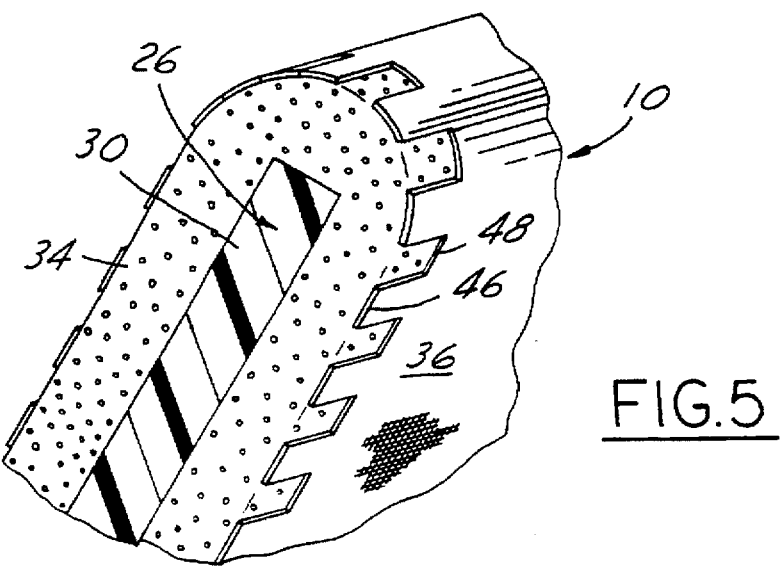
FIG. 5 is an enlarged view of the area labeled 2 in FIG. 1, showing yet another alternative embodiment of a door assembly according to the present invention.

Three preferred non-linear terminal film edge configurations are illustrated in FIGS. 3-5. Terminal film edge 40 in the FIG. 3 embodiment comprises a pattern of generally arcuate indentations 42. Terminal film edge 44 in the FIG. 4 embodiment comprises a sawtooth pattern with generally V-shaped notches or indentations. Terminal film edge 46 in FIG. 5 comprises a pattern of generally rectangular indentations 48. Other configurations are possible, of course, and will be readily apparent to those skilled in the art based on the teachings of this disclosure.

The patterns in terminal edges 40, 44, and 46 are preferably formed with a cutting tool or stamping die. In the embodiment illustrated in FIG. 5, film member 36 is cut to the desired shape before being attached to seal member 34. Alternatively, as in the embodiments illustrated in FIGS. 3 and 4, film member 36 and seal member 34 could be joined before being cut to the desired shape. In this way, seal member 34 may be provided with a terminal edge that is congruently disposed with the terminal edge of film member 36.

While FIGS. 3-5 illustrate only one terminal edge 30 of door panel 26, it should be understood that seal member 34 and film member 36 may each include a pair of terminal edges generally disposed along the two terminal side edges 30 of door panel 26. Likewise, it should be understood that seal member 34 and film member 36 may also have terminal edges generally disposed along terminal distal edge 32 of door panel 26.

While the invention has been shown and described in its preferred embodiments, it will be clear to those skilled in the arts to which it pertains that many changes and modifications may be made thereto without departing from the scope of the invention as set forth in the appended claims.

What is claimed is:

1. A door assembly for controlling air flow through a motor vehicle climate control system, comprising:

a door panel having a pair of opposed faces and at least one terminal edge;

a seal member attached to at least one of said pair of faces, said seal member having a terminal edge generally disposed along said at least one terminal edge of said panel; and a film member overlying said seal member, said film member having a terminal edge generally disposed along said at least one terminal edge of said panel, said film member terminal edge being substantially non-linear such that noise produced by air flow passing around said at least one terminal edge of said panel is minimized.

2. A door assembly according to claim 1, wherein said non-linear film edge comprises a sawtooth configuration.

3. A door assembly according to claim 1, wherein said non-linear film edge comprises a plurality of generally arcuate indentations.

4. A door assembly according to claim 1, wherein said non-linear film edge comprises a plurality of generally rectangular indentations.

5. A door assembly according to claim 1, wherein said seal member terminal edge is congruently disposed with said film member terminal edge.

6. A door assembly according to claim 5, wherein said non-linear film edge comprises a sawtooth configuration.

7. A door assembly according to claim 5, wherein said non-linear film edge comprises a plurality of generally arcuate indentations.

8. A door assembly according to claim 5, wherein said non-linear film edge comprises a plurality of generally rectangular indentations.

9. A door assembly for controlling air flow through a motor vehicle climate control system, comprising:

a generally rectangular, generally planar door panel having a pair of opposed faces, a pivot edge and three free terminal edges, said three free terminal edges comprising two terminal side edges and a terminal distal edge;

a seal member attached to at least one of said pair of faces, said seal member having a pair of terminal edges generally disposed along said terminal side edges of said panel; and a film member overlying said seal member, said film member having a pair of terminal edges generally disposed along said terminal side edges of said panel, said pair of film member terminal edges being substantially non-linear such that noise produced by air flow passing around said terminal side edges of said panel is minimized.

10. A door assembly according to claim 9, wherein said pair of non-linear film edges have a sawtooth configuration.

11. A door assembly according to claim 9, wherein said pair of non-linear film edges include a plurality of generally arcuate indentations.

12. A door assembly according to claim 9, wherein said pair of non-linear film edges include a plurality of generally rectangular indentations.

13. A door assembly according to claim 9, wherein said pair of seal member terminal edges are congruently disposed with said pair of film member terminal edges.

14. A door assembly according to claim 13, wherein said pair of non-linear film edges have a sawtooth configuration.

15. A door assembly according to claim 13, wherein said pair of non-linear film edges include a plurality of generally arcuate indentations.

16. A door assembly according to claim 13, wherein said pair of non-linear film edges include a plurality of generally rectangular indentations.

17. A door assembly according to claim 9, wherein said seal member and said film member each include three terminal edges generally disposed along said three free terminal edges of said panel, said three film member terminal edges being substantially non-linear such that noise produced by air flow passing around said door assembly is minimized.

* * * * *